United States Patent
Nitta

(10) Patent No.: US 9,371,933 B2
(45) Date of Patent: Jun. 21, 2016

(54) FLOW REGULATOR

(75) Inventor: Toshinori Nitta, Saitama (JP)

(73) Assignee: FUJIKURA RUBBER LTD., Tokyo (JP)

( * ) Notice: Subject to any disclaimer, the term of this patent is extended or adjusted under 35 U.S.C. 154(b) by 110 days.

(21) Appl. No.: 14/351,272

(22) PCT Filed: Jun. 28, 2012

(86) PCT No.: PCT/JP2012/066506
§ 371 (c)(1),
(2), (4) Date: Apr. 11, 2014

(87) PCT Pub. No.: WO2013/057983
PCT Pub. Date: Apr. 25, 2013

(65) Prior Publication Data
US 2014/0312256 A1    Oct. 23, 2014

(30) Foreign Application Priority Data

Oct. 20, 2011 (JP) .................. 2011-230608

(51) Int. Cl.
*F16K 31/06* (2006.01)
(52) U.S. Cl.
CPC .................... *F16K 31/0665* (2013.01)
(58) Field of Classification Search
CPC .................... F16K 31/0665; F16K 31/0658
USPC ............ 251/129.14, 129.15, 129.18; 335/280
See application file for complete search history.

(56) References Cited

U.S. PATENT DOCUMENTS 3,107,893 A * 10/1963 Bashe ................. F16K 31/0665
251/129.14

(Continued)

FOREIGN PATENT DOCUMENTS

EP          0565292 A1    10/1993
JP          S50-23729 U    6/1948

(Continued)

OTHER PUBLICATIONS

International search report for PCT/JP2012/066506 dated Aug. 21, 2012.

*Primary Examiner* — John K Fristoe, Jr.
*Assistant Examiner* — Andrew J Rost
(74) *Attorney, Agent, or Firm* — McCormick, Paulding & Huber LLP

(57) ABSTRACT

A flow regulator which is capable of suppressing hysteresis and includes a housing which includes a fluid inlet port, a fluid outlet port and a valve seat positioned in a communication channel, through which the fluid inlet port and the fluid outlet port are communicatively connected; a plunger guide cylinder coupled to the housing; a plunger provided at an end thereof with a valve body which moves toward and away from the valve seat, the plunger being inserted into the plunger guide cylinder to be freely movable in an axial direction; a spring which biases the plunger in a direction to bring the valve body into contact with the valve seat; and an electromagnetic device which moves the plunger in a valve opening direction against the spring. A clearance exists between an outer periphery of the plunger and an inner periphery of the plunger guide cylinder, the clearance being sufficient for the outer periphery of the plunger and the inner periphery of the plunger guide cylinder to be completely in noncontact with each other, to thereby make a sliding resistance therebetween zero in a state where axes of the plunger and the plunger guide cylinder are aligned. The valve body is formed as a ball, and one and the other of the valve body and the valve seat are made of a rigid body and an elastic material, respectively. The spring is a compression coil spring which is concentric with the plunger and is provided in an extended state between a fixed portion of the plunger guide cylinder and a movable portion on the plunger side.

2 Claims, 3 Drawing Sheets

(56) References Cited

U.S. PATENT DOCUMENTS

| | | | | |
|---|---|---|---|---|
| 3,578,284 A | * | 5/1971 | Martini | F16K 31/0655 251/30.02 |
| 3,887,162 A | | 6/1975 | Antoni et al. | |
| 5,996,628 A | * | 12/1999 | Najmolhoda | F16K 31/0613 137/625.61 |
| 2001/0023930 A1 | * | 9/2001 | Kobayashi | B60T 8/363 251/129.14 |
| 2006/0097210 A1 | * | 5/2006 | Fong | B60T 8/363 251/129.15 |

FOREIGN PATENT DOCUMENTS

| | | |
|---|---|---|
| JP | 49-43218 | 4/1974 |
| JP | S59-30980 | 2/1984 |
| JP | S60-138076 | 9/1985 |
| JP | S61-168369 | 10/1986 |
| JP | S64-35273 | 3/1989 |
| JP | H01-148180 | 10/1989 |
| JP | 08-270824 A | 10/1996 |
| JP | 2003-301962 A | 10/2003 |
| JP | 2007-107451 A | 4/2007 |
| JP | 2011-099563 A | 5/2011 |

* cited by examiner

FLOW REGULATOR

CROSS REFERENCE TO RELATED APPLICATIONS

This application claims the priority of Japanese patent application No. 2011-230608, filed on Oct. 20, 2011 and PCT Application No. PCT/JP2012/066506, filed on Jun. 28, 2012, the disclosures of which are incorporated herein by reference in their entirety.

TECHNICAL FIELD

The present invention relates to a flow regulator for regulating a flow rate by an electromagnetic force.

BACKGROUND ART

A flow regulator in which a valve (plunger) is spring-biased against a valve seat to close a flow channel at normal times and is opened by attracting and moving the valve by an electromagnetic force is known as the above-mentioned type of flow regulator. The amount of movement of the valve in the valve opening direction can be adjusted by varying the magnitude of the electromagnetic force (electric current).

SUMMARY OF INVENTION

Technical Problem

In this type of electromagnetically-driven flow regulator (valve), there has been a problem with hysteresis occurring, which causes the valve opening degree to vary between the time at which the valve is moved in the valve opening direction (at which the current is increased) and the time at which the valve is moved in the valve closing direction (at which the current is decreased) while at the same current value. For instance, in European Patent Publication No. 0565292A1, a plunger having a valve body at the fore-end thereof is inserted into a plunger guide in a noncontact manner, while an elastic ring member is interposed between a portion of the outer periphery of the plunger and the inner wall of the plunger guide. However, this elastic ring member obviously becomes a cause of hysteresis. Additionally, in European Patent Publication No. 0565292A1, the centering (alignmentability) of the valve body at the fore-end of the plunger relative to the valve seat is not ensured, which becomes a cause of slight leakage at the valve when the valve is closed.

An object of the present invention is to provide a flow regulator which makes it possible to suppress hysteresis with a simple structure. Additionally, an object of the present invention is to provide a flow regulator which makes it possible to minimize a leakage at the valve at the time of valve closure while suppressing hysteresis.

Solution to Problem

The present invention has been accomplished based on the findings that, while the plunger and the plunger guide are made in noncontact with each other (the plunger and the plunger guide are given a difference in diameter therebetween which is sufficient to form an annular clearance between the plunger and the plunger guide when the axes thereof are aligned), alignmentability between the plunger (the valve body) and the valve seat is secured by a coil spring, a spherical valve body and an annular valve seat.

The present invention is characterized by a flow regulator including a housing, which includes a fluid inlet port, a fluid outlet port and a valve seat positioned in a communication channel, through which the fluid inlet port and the fluid outlet port are communicatively connected; a plunger guide cylinder coupled to the housing; a plunger provided at an end thereof with a valve body which moves toward and away from the valve seat, the plunger being inserted into the plunger guide cylinder to be freely movable in an axial direction; a spring which biases the plunger in a direction to bring the valve body into contact with the valve seat; and an electromagnetic device which moves the plunger in a valve opening direction against the spring. A clearance exists between an outer periphery of the plunger and an inner periphery of the plunger guide cylinder, the clearance being sufficient for the outer periphery of the plunger and the inner periphery of the plunger guide cylinder to be completely in noncontact with each other, to thereby make a sliding resistance therebetween zero in a state where axes of the plunger and the plunger guide cylinder are aligned. The valve body is formed as a ball, and one and the other of the valve body and the valve seat are made of a rigid body and an elastic material, respectively. The spring is a compression coil spring which is concentric with the plunger and is provided in an extended state between a fixed portion of the plunger guide cylinder and a movable portion on the plunger side.

A valve body holder, formed as a separate member from the plunger, can be coupled to the end of the plunger, wherein the valve body holder is provided with an internal tapered hole which causes part of an end of the valve body that is formed as the ball to protrude toward the valve seat. The flow regulator further includes a primary valve compression coil spring, which biases the valve body in a direction to make the valve body project from the internal tapered hole, the primary valve compression coil spring being concentric with the compression coil spring.

The valve seat can be provided on an end of a valve seat nozzle, on the valve body side which is coupled to the housing in a manner to allow an axial position of the valve seat nozzle to be freely adjusted.

A clearance between the outer periphery of the plunger and the inner periphery of the plunger guide cylinder is in a range of 0.2 through 0.6 mm when an outer diameter of the plunger is set in a range of 3.3 through 3.7 mm and an inner diameter of the plunger guide cylinder is set in a range of 4.1 through 4.5 mm.

ADVANTAGEOUS EFFECTS OF INVENTION

According to the present invention, an electromagnetically-driven flow regulator is achieved, which makes it possible to suppress hysteresis with a simple structure and to minimize a leakage at the valve at the time of valve closure.

DESCRIPTION OF THE PREFERRED EMBODIMENTS

Figure 1:
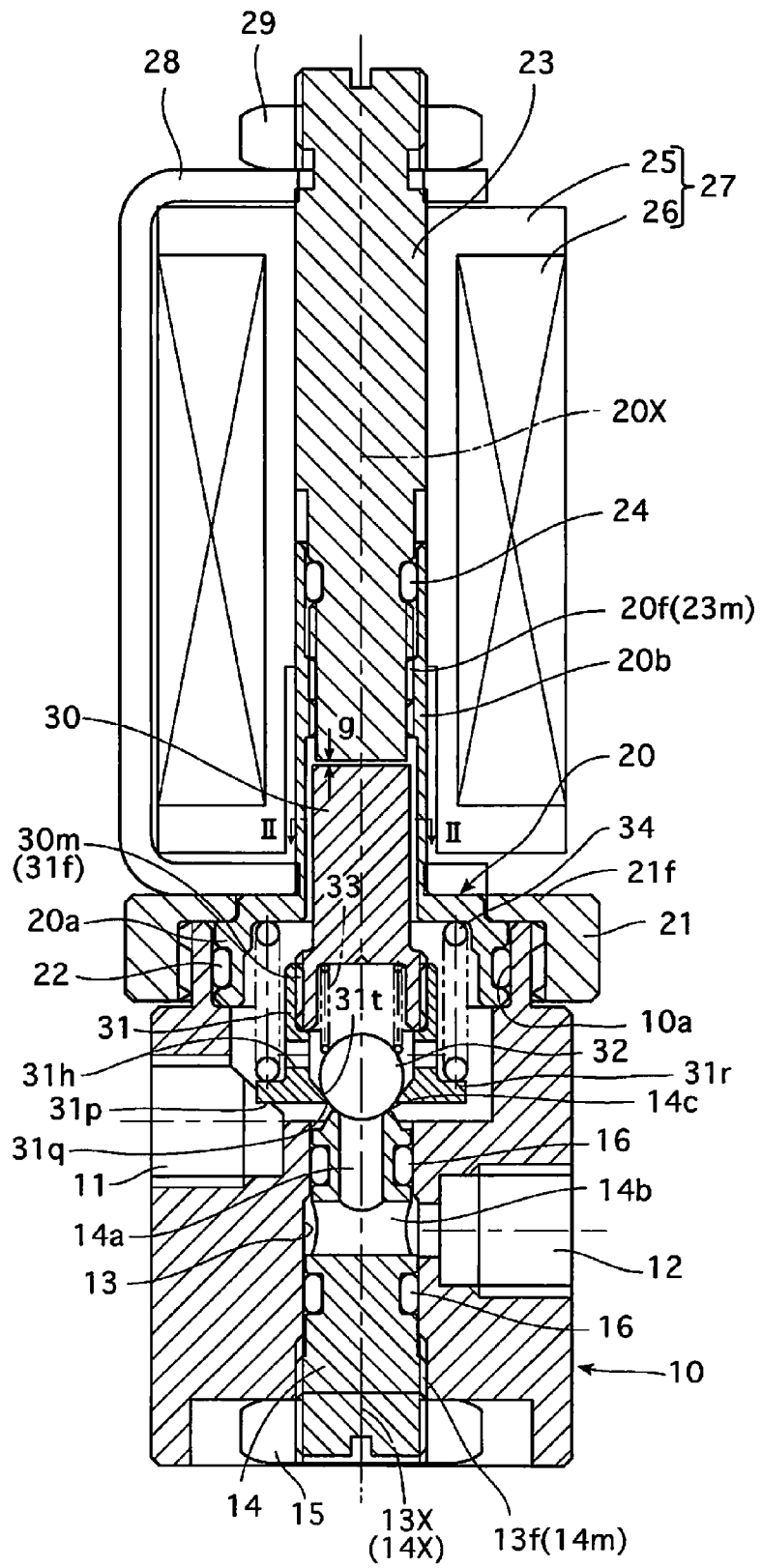
FIG. 1 is a longitudinal sectional view showing an embodiment of a flow regulator according to the present invention.
Figure 2:
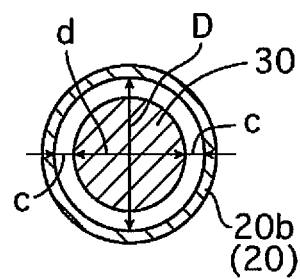
FIG. 2 is a cross sectional view taken along the line II-II shown in FIG. 1.

FIGS. 1 and 2 show an embodiment of a flow regulator (valve) according to the present invention. A block-like housing 10 is provided with a fluid inlet port 11, a fluid outlet port 12 and a communication channel 13 through which the inlet port 11 and the outlet port 12 are communicatively connected. The communication channel 13 is a hole having an axis 13X and is circular in cross section, and is provided, shown in a lower part of the drawing, with a female thread portion 13f. A valve seat nozzle 14, in the shape of a cylindrical column, is inserted into the communication channel 13 with an axis 14X of the valve seat nozzle 14 being coincident with the axis 13X of the communication channel 13, and a male thread 14m of the valve seat nozzle 14 that is provided at the lower end thereof is screw-engaged with the female thread portion 13f. The valve seat nozzle 14 can adjust the axial position thereof in the communication channel 13 by adjusting the screw-engaged position of the valve seat nozzle 14 with respect to the female thread portion 13f, and the valve seat nozzle 14 can be fixed at a position after the adjustment by a lock nut (hexagon nut) 15.

The valve seat nozzle 14 that is made of metal (rigid body) is provided on the axis thereof with an axial channel 14a and a radial channel 14b which is communicatively connected to the axial channel 14a, and the axial channel 14a is communicatively connected to the inlet port 11 regardless of the axial position of the valve seat nozzle 14 while radial channel 14b is communicatively connected to the outlet port 12. The fore-end of the axial channel 14a constitutes an annular valve seat 14c. The reference numeral 16 designates O-rings which prevent fluid other than the fluid flowing from the inlet port 11 to the outlet port 12 via the axial channel 14a and the radial channel 14b from leaking.

A plunger guide cylinder 20 is fixed onto the housing 10 via a stopper ring 21. The axis 20X of the plunger guide cylinder 20 is coincident with the axis 14X of the valve seat nozzle 14, a large-diameter cylindrical portion 20a formed at the lower end of the plunger guide cylinder 20 is inserted into a circular stepped portion 10a formed at the upper end of the housing 10, the stopper ring 21 is screw-coupled to the housing 10, and a flange 21f of the stopper ring 21 presses the large-diameter cylindrical portion 20a into the circular stepped portion 10a to fix the large-diameter cylindrical portion 20a to the circular stepped portion 10a. The reference numeral 22 designates an O-ring which seals the gap between the large-diameter cylindrical portion 20a and the circular stepped portion 10a.

An upper portion of the plunger guide cylinder 20 constitutes a small-diameter cylindrical portion 20b which is coincident with the large-diameter cylindrical portion 20a, and a male thread 23m of a plunger receiving rod 23, made of a ferromagnetic material, is screw-engaged with a female thread portion 20f formed on an upper portion of the small-diameter cylindrical portion 20b. The axial position of the plunger receiving rod 23 can be adjusted by changing the screw-engaged position of the male thread 23m relative to the female thread portion 20f. The reference numeral 24 designates an O-ring which prevents fluid from leaking from the screw-engaged portion. A solenoid (electromagnetic device) 27 configured of a coil housing (yoke) 25 and a coil 26 is positioned around the plunger receiving rod 23, and the position of the solenoid 27 is fixed by a holder 28. The reference numeral 29 designates a lock nut (hexagon nut) which is fixed after the axial position of the plunger receiving rod 23 is adjusted.

A plunger receiving rod 30 made of a ferromagnetic material is positioned inside the small-diameter cylindrical portion 20b of the plunger guide cylinder 20. As accentuated in FIG. 2, the outer diameter of the plunger 30 and the inner diameter of the small-diameter cylindrical portion 20b are set to create clearance therebetween which is sufficient for the outer periphery of the plunger 30 and the inner periphery of the small-diameter cylindrical portion 20b to be in totally non-contact with each other, to thereby make the sliding resistance therebetween zero in a state where the axes of the plunger 30 and the small-diameter cylindrical portion 20ba are aligned. More specifically, for instance, when the outer diameter d of the plunger 30 is set in the range of 3.3 to 3.7 mm and the inner diameter D of the small-diameter cylindrical portion 20b is set in the range of 4.1 to 4.5 mm, the clearance c is in the range of 0.2 to 0.6 mm ((D−d)/2). More desirably, when the outer diameter d of the plunger 30 is set in the range of 3.4 to 3.6 mm and the inner diameter D of the small-diameter cylindrical portion 20b is set in the range of 4.2 to 4.4 mm, the clearance c is in the range of 0.3 to 0.5 mm.

A female thread portion 31f formed on a valve body holder 31 is screw-engaged concentrically with a male thread portion 30m formed on an end (the lower end with respect to FIG. 1) of the plunger 30. The valve holder 31 is provided, at the lower end thereof with respect to FIG. 1 that has the female thread portion 31f, with an orthogonal-to-axis plane portion 31p, and an internal tapered hole 31t is formed on a central portion (on the axis 20X) of the orthogonal-to-axis plane portion 31p. The internal tapered hole 31t has a rotationally-symmetrical shape which reduces the wall thickness between the internal tapered hole 31t and the orthogonal-to-axis plane portion 31p toward the center of the internal tapered hole 31t, and a hole 31q which allows a spherical valve body 32 to jut therefrom is formed at a central part of the internal tapered hole 31t. In addition, air holes 31h for exerting fluid pressure on the rear surface of the spherical valve body 32 are formed in the valve body holder 31 (for preventing a pressure difference from occurring between two sides of the spherical valve body 32). The spherical valve body 32 is made of rubber (e.g., silicon rubber, nitrile rubber or fluorocarbon rubber) in this embodiment, and a primary valve compression coil spring 33 which biases the spherical valve body 32 in a direction to make the spherical valve body 32 project from the internal tapered hole 31t is inserted in between the plunger 30 and the spherical valve body 32. In addition, a compression coil spring 34 concentric with the plunger 30 (the primary valve compression coil spring 33) which biases the plunger 30 in a direction to move the plunger 30 toward the annular valve seat 14c is inserted in between the large-diameter cylindrical portion 20a (a fixed portion of the plunger guide cylinder) and a flange 31 r of the valve body holder 31, which has the orthogonal-to-axis plane portion 31p (a movable portion on the plunger side).

The flow regulator that has the above described structure operates as follows. In a non-energized state of the solenoid 27 (the coil 26), the forces of the primary valve compression coil spring 33 and the compression coil spring 34 cause the spherical valve body 32 to sit on the annular valve seat 14c to cut off the communication between the inlet port 11 and the outlet port 12. In the valve closing structure composed of the spherical valve body 32 and the annular valve seat 14c, centripetal (aligning) action due to the spherical shape of the spherical valve body 32 occurs and centripetal (aligning) action occurs also in the primary valve compression coil spring 33 and the compression coil spring 34, and accordingly, the possibility of the outer periphery of the plunger 30 and the inner periphery of the small-diameter cylindrical portion 20b coming into contact with each other (the possibility of sliding resistance occurring when the plunger 30 moves) is extremely small. In addition, fluid leakage which occurs when the valve is closed can be minimized by making one of the spherical valve body 32 and the annular valve seat 14c (the spherical valve body 32 in this particular embodiment) out of an elastic material.

Figure 3:
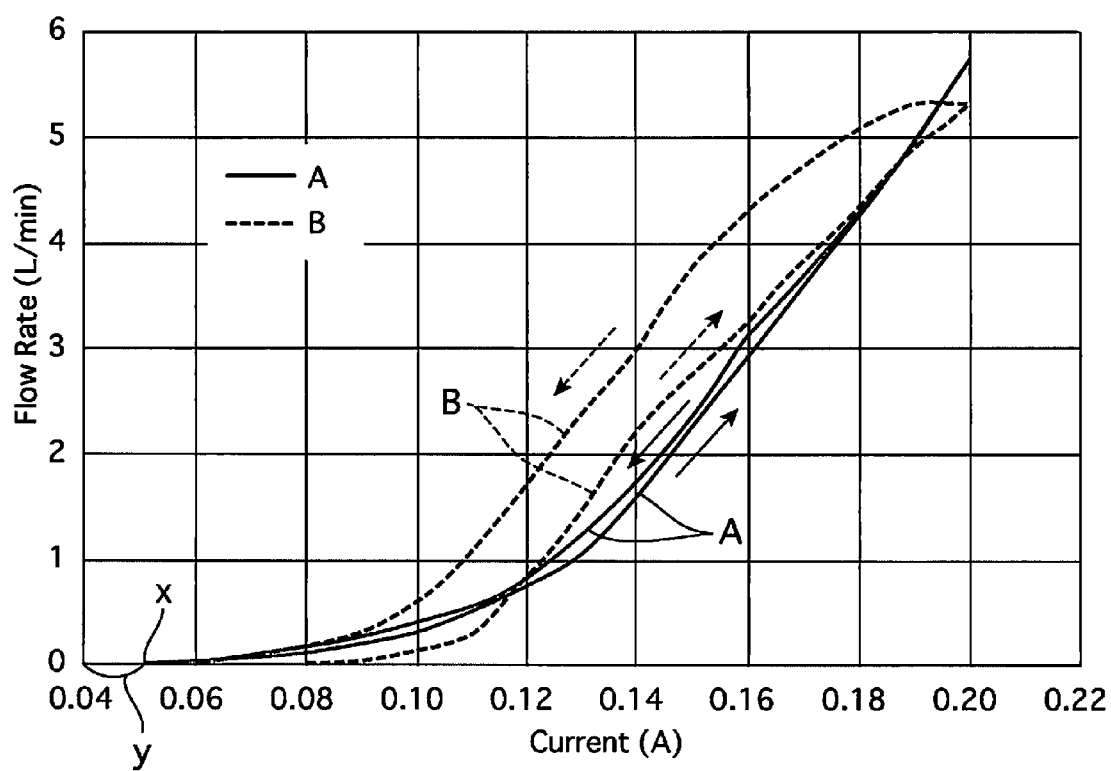
FIG. 3 is a hysteresis diagram of the flow regulator according to the present invention and a comparative example.

In this valve closed state, immediately after the coil 26 commences to be energized, an attracting upward force to move the plunger 30 upward commences to act on the plunger 30. In FIG. 3, a time x designates the time at which this attracting upward force overcomes the forces of the primary valve compression coil spring 33 and the compression coil spring 34 to thereupon start opening the valve. The flow rate increases and decreases substantially in proportion to the amount of electric current through the coil 26 if the amount of electric current through the coil 26 is increased and decreased, respectively. The difference in flow rate at the same current value between the time of increase of the electric current through the coil 26 and the time of decrease of the electric current through the coil 26 corresponds to the hysteresis; the smaller this difference, the more favorable for the flow regulator. "A" in FIG. 3 shows an example of hysteresis according to the present embodiment, and "B" in FIG. 3 shows an example of hysteresis in the case where sliding resistance occurs between the plunger 30 and the small-diameter cylindrical portion 20b. The present embodiment of the flow regulator has been proven that the hysteresis thereof is small.

In FIG. 3, the range of electric current y from the commencement of the application of electric current to a time x at which the valve commences to be opened, in which the valve is not caused to open, is referred to as "dead band". The range of electric current y can be adjusted by an initial setting of the spring force which presses the spherical valve body 32 against the annular valve seat 14c. In the present embodiment, the range of electric current y can be finely adjusted because the magnitude of the spring pressure force exerted on the annular valve seat 14c via the spherical valve body 32 can further be adjusted by making adjustments to the axial position of the valve seat nozzle 14.

Additionally, the present embodiment of the flow regulator is provided with a double biasing structure in which the spherical valve body 32 is pressed against the annular valve seat 14c directly by the primary valve compression coil spring 33 and pressed against the annular valve seat 14c by the compression coil spring 34.

According to this double biasing structure, the following effects can be obtained:

(1) The spherical valve body 32 is brought into engagement with the annular valve seat 14c by the force of the primary valve compression coil spring 33 to align centripetally (action of bringing the axis of the plunger 30 in alignment with the axis of the small-diameter cylindrical portion 20b).

(2) The axis of the valve body holder 31 (the plunger 30) is made to coincide with the axis 20X by the force of the compression coil spring 34 to align centripetally.

(3) The inclinations of the graphs of the current and the flow rate in FIG. 3 are adjusted by the force of the compression coil spring 34, and the spherical valve body 32 is brought into slight contact (abutment) with the annular valve seat 14c, by the force of the compression coil spring 34, in a non-energized state of the coil 26 (the valve does not necessarily have to be closed).

(4) The spherical valve body 32 is made to sit on the annular valve seat 14c (to close the valve) by the force of the primary valve coil spring 33 that is smaller than the force of the compression coil spring 34 to improve sensitivity. In other words, the range of electric current y in FIG. 3 can be shortened.

Although it is desirable that the valve body holder 31 and the primary valve compression coil spring 33 be provided, it is possible that the valve body holder 31 and the primary valve compression coil spring 33 be omitted (a certain amount of centripetal action can be obtained even if the plunger 30 is provided directly at the fore-end thereof with the spherical valve body 32 and if the spherical valve body 32 (the plunger 30) is biased to move only by the compression coil spring 34).

In addition, the magnitude of a gap g between the lower end of the plunger receiving rod 23 in FIG. 1 and the upper end of the plunger 30 is related to the magnitude of attraction force of the plunger 30 by the solenoid 27. The magnitude of the gap g can be adjusted by the amount of screw engagement of the male thread 23m of the plunger receiving rod 23 with respect to the female thread portion 20f of the small-diameter cylindrical portion 20b and the lock nut 29.

Although the spherical valve body 32 is made of rubber and the valve seat 14c (the valve seat nozzle 14) is made of metal (rigid body) in the above described embodiment, similar effects can be obtained even if the valve body is made of a steel ball and the valve seat is made of rubber.

INDUSTRIAL APPLICABILITY

The electromagnetically-driven flow regulator according to the present invention is capable of suppressing hysteresis and minimizing the valve leakage at the valve at the time of valve closure, thus being suitably applicable to hydraulic circuits in general.

REFERENCE SIGNS LIST

10 Housing
11 Inlet port
12 Outlet port
13 Communication channel
14 Valve seat nozzle
14c Annular valve seat (Valve seat)
15 Lock nut
16 O-ring
20 Plunger guide cylinder
21 Stopper ring
22 O-ring
23 Plunger receiving rod
25 Coil housing
26 Coil
27 Solenoid
29 Lock nut
30 Plunger
31 Valve holder
31t Internal tapered hole
32 Spherical valve body (Valve body)
33 Primary valve compression coil spring
34 Compression coil spring (spring, coil spring)

The invention claimed is:

1. A flow regulator comprising:
a housing (10) which includes a fluid inlet port (11), a fluid outlet port (12) and a valve seat (14c) positioned in a communication channel (13), through which said fluid inlet port and said fluid outlet port are communicatively connected;
a plunger guide cylinder (20) coupled to said housing;
a plunger (30) provided at an end thereof with a valve body (32) which moves toward and away from said valve seat, said plunger being inserted into said plunger guide cylinder to be freely movable in an axial direction;
a spring (34) which biases said plunger in a direction to bring said valve body into contact with said valve seat; and an electromagnetic device (27) which moves said plunger in a valve opening direction against said spring, wherein a clearance exists between an outer periphery of said plunger and an inner periphery of said plunger guide cylinder, said clearance being sufficient for said outer periphery of said plunger and said inner periphery of said plunger guide cylinder to be completely in non-contact with each other, to thereby make a sliding resistance therebetween zero in a state where axes of said plunger and said plunger guide cylinder are aligned, wherein said valve body is formed as a ball, and one and the other of said valve body and said valve seat are made of a rigid body and an elastic material, respectively, wherein said spring is a compression coil spring (34) which is concentric with said plunger and is provided in a extended state between a fixed portion (20a) of said plunger guide cylinder and a movable portion on a plunger side (31p), wherein a valve body holder (31), formed as a separate member from said plunger, is coupled to said end of said plunger, wherein said valve body holder is provided with an internal tapered hole (31t) which causes part of an end of said valve body that is formed as said ball to protrude toward said valve seat, wherein said flow regulator further comprises a primary valve compression coil spring (33), which biases said valve body in a direction to make said valve body project from said internal tapered hole, said primary valve compression coil spring being concentric with said compression coil spring, wherein said valve seat is provided on an end of a valve seat nozzle (14), on a valve body side which is coupled to said housing in a manner to allow an axial position of said valve seat nozzle to be freely adjusted so that a spring force of said primary valve compression coil spring (33) pressing said valve body against said valve seat can be adjusted, whereby a range of electric current, from commencement of application of electric current until the valve commences to open, can be finely adjusted, and wherein the force of said primary valve compression spring (33) is smaller than that of said compression coil spring (34).

2. The flow regulator according to claim 1, wherein a clearance between said outer periphery of said plunger and said inner periphery of said plunger guide cylinder is in a range of 0.2 through 0.6 mm when an outer diameter of said plunger is set in a range of 3.3 through 3.7 mm and an inner diameter of said plunger guide cylinder is set in a range of 4.1 through 4.5 mm.

\* \* \* \* \*